H. HORTON.
CORN HOLDER.
APPLICATION FILED FEB. 21, 1912.
1,030,729.
Patented June 25, 1912.
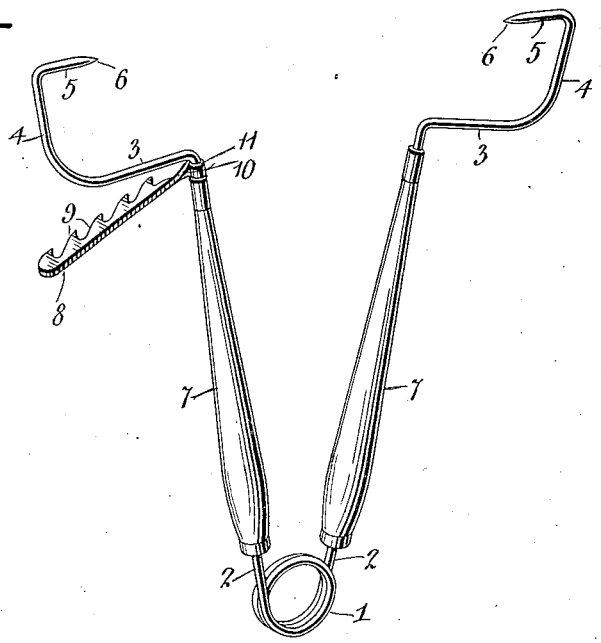
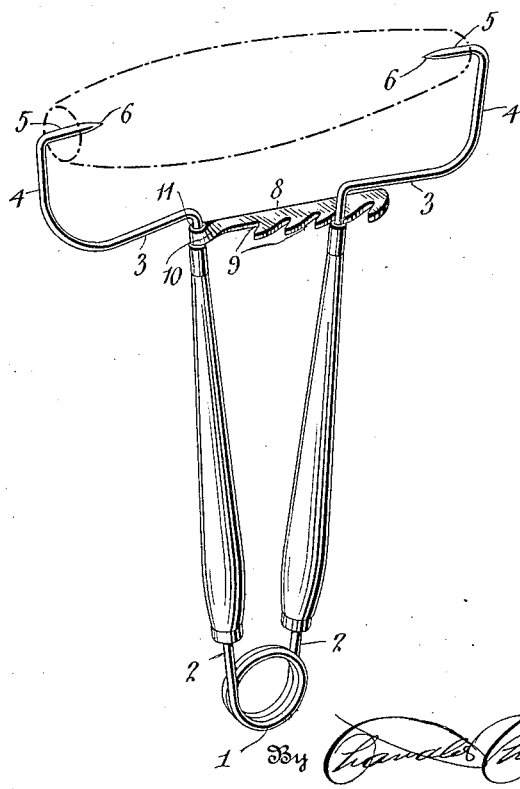
Witnesses
Inventor
H. Horton
By
Attorneys.

UNITED STATES PATENT OFFICE.

HENRY HORTON, OF CLEVELAND, TENNESSEE.

CORN-HOLDER.

1,030,729.　　　　　Specification of Letters Patent.　　Patented June 25, 1912.

Application filed February 21, 1912. Serial No. 679,083.

*To all whom it may concern:*

Be it known that I, HENRY HORTON, a citizen of the United States, residing at Cleveland, in the county of Bradley, State of Tennessee, have invented certain new and useful Improvements in Corn-Holders; and I do hereby declare the following to be a full, clear, and exact description of the invention, such as will enable others skilled in the art to which it appertains to make and use the same.

This invention relates to corn holders, and has for its object to construct a device of the type which is simple in construction, effective in operation, and one which serves to hold a hot ear of corn while the same is being eaten.

A further object of the invention is to produce an article of this class which may be manufactured at a minimum cost, while at the same time forming an attractive table article.

With these and other objects in view, the invention consists in certain novel features of construction, combination and arrangement of parts as will be hereinafter fully described and claimed.

In the drawing: Figure 1 is a perspective view of the device. Fig. 2 is a similar view, showing an ear of corn between the arms.

The device consists of a single length of resilient wire, the same being formed intermediate its length with coils 1, the helices of which terminate in arms 2. The arms 2 terminate at their outer ends in horizontal portions 3 which are bent at right angles to the arms 2, said portions in turn terminate in short arms 4 which lie parallel with the arms 2. Formed integral with the arms 4 are inwardly directed projections 5, said projections being substantially half the length of the horizontal portions 3, and are pointed as at 6, so as to more readily enter the opposite ends of the corn cob, when in use.
Wooden sleeves 7 are secured to the arms 2, and form convenient grips for the hand for manipulating the device.

A latch member 8 is provided, the same being formed from a strip of metal, and having one of its edges provided with a plurality of notches 9. The latch member 8 is partially twisted, as at 10, near one end so as to produce an eye 11 for pivotally engaging the extreme upper end of one of the arms 2, the downward movement of said member being limited by the upper end of one of the grip sleeves 7. By partially twisting the latch member 8, the eye 11 thereof is disposed at right angles to said member, thus the notches 9 thereon will be in a position to engage the upper end of the other arm 2.

It is customary when preparing corn for table use to sever the minor end thereof, thus allowing the ready entrance of one of the projections 5 in the pith, while the other projection 5 engages the cob in a similar manner.

In operation the ear of corn is prepared for use, and the projections 5 forced in the ends thereof, upon pressure being applied to the grip sleeves 7, whereupon by swinging the device in one direction, the latch member 8 will be swung by such movement so that one of the notches thereof will engage the opposite arm. After the corn has been removed from the cob, the movement of the device is reversed, thus swinging the latch member from engagement to release the cob.

From the foregoing description it will be seen that a device has been provided for holding corn while the same is being eaten, the construction and operation being particularly well adapted for use by one-armed persons, as it is only necessary that the device be swung in a direction to either engage or disengage the ear of corn, such action being readily accomplished by the construction of the latch member 8. Further, by forming the coils 1 for the device, the arms and their parts are spread a sufficient distance apart to engage and hold an ear of corn of the large size, or the arms may be moved toward each other to engage a small ear.

What is claimed is:

A corn holder consisting of a single length of wire having coils formed intermediate its ends, the helices of certain of the coils terminating in arms having grip sleeves thereon, said arms terminating at their upper ends in horizontal portions which in turn terminate in short vertical arms having their ends bent inwardly to form pointed projections for engaging an ear of corn, a latch member having an eye formed at one end and adapted to pivotally engage one of the first named arms, said latch member having notches formed upon one edge for adjustably engaging the other of the first named arms, whereby an ear of corn is held against accidental removal.

In testimony whereof, I affix my signature, in presence of two witnesses.

HENRY HORTON.

Witnesses:
C. W. HARLE,
F. E. SHEDDAR.

Copies of this patent may be obtained for five cents each, by addressing the "Commissioner of Patents, Washington, D. C."